Jan. 12, 1926.

G. W. MacKENZIE 1,569,290

LIQUID MEASURING APPARATUS

Filed Nov. 4, 1920 3 Sheets-Sheet 1

Witnesses:

Inventor:

Jan. 12, 1926.  1,569,290
G. W. MacKENZIE
LIQUID MEASURING APPARATUS
Filed Nov. 4, 1920   3 Sheets-Sheet 2

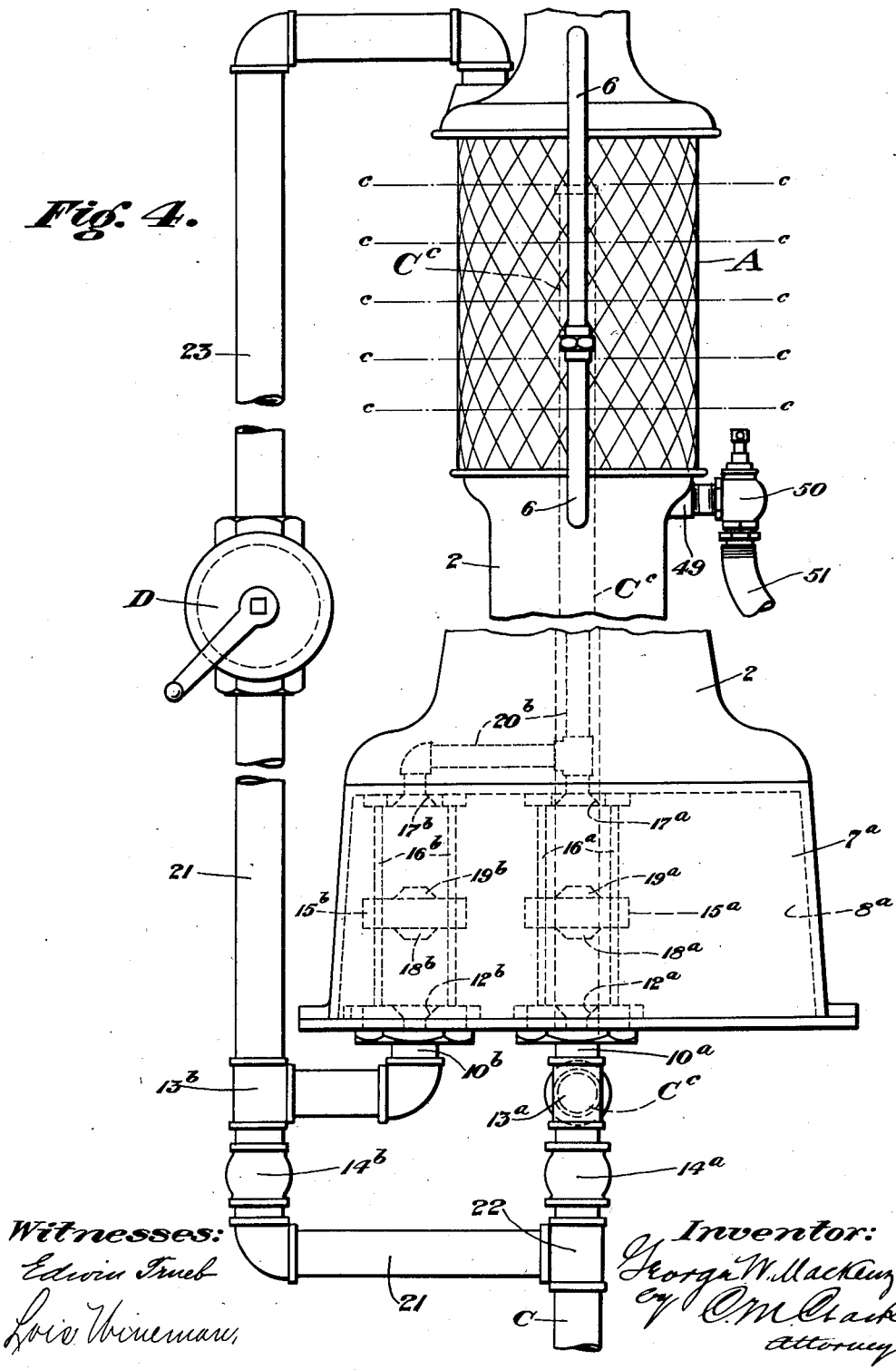

Patented Jan. 12, 1926.

1,569,290

UNITED STATES PATENT OFFICE.

GEORGE W. MacKENZIE, OF BEAVER, PENNSYLVANIA, ASSIGNOR TO GUARANTEE LIQUID MEASURE COMPANY, OF ROCHESTER, PENNSYLVANIA, A CORPORATION OF DELAWARE.

LIQUID-MEASURING APPARATUS.

Application filed November 4, 1920. Serial No. 421,668.

*To all whom it may concern:*

Be it known that I, GEORGE W. MACKENZIE, a citizen of the United States, residing at Beaver, in the county of Beaver and State of Pennsylvania, have invented certain new and useful Improvements in Liquid-Measuring Apparatus, of which the following is a specification.

My invention consists of an improvement in liquid measuring apparatus for delivering gasoline or other liquids in measured quantities from a measuring or secondary tank connected with a main reservoir or source of supply at any suitable location, adapted to receive the liquid from the main reservoir and to measure the amount to be delivered from the secondary tank to a purchaser or user, as hereinafter described.

The invention particularly refers to means for collecting the surplus or overflow from the measuring vessel in a sub or auxiliary vessel or tank, from which it may be quickly and easily returned to the measuring vessel, with any additional amount so as to avoid any loss of time due to the measuring vessel or apparatus being located at a distance from the main source of supply. It also provides for installation with any of the several vacuum or force feed machines in common use, although in the present application I have shown it as incorporated with a machine of the class shown in my prior Patents No. 1,297,210 and No. 1,326,207, in which the desired amount of liquid to be vended is charged into the measuring vessel by exhausting the air therefrom, to create a partial vacuum therein.

I have also shown the application of the invention to a force feed or pump machine, and it will be understood that it is not limited to either type, but may be used with either.

In the drawings illustrating the invention,

Fig. 4 is a view similar to Fig. 1 showing the application of the invention to a force feed apparatus.

Figure 1:
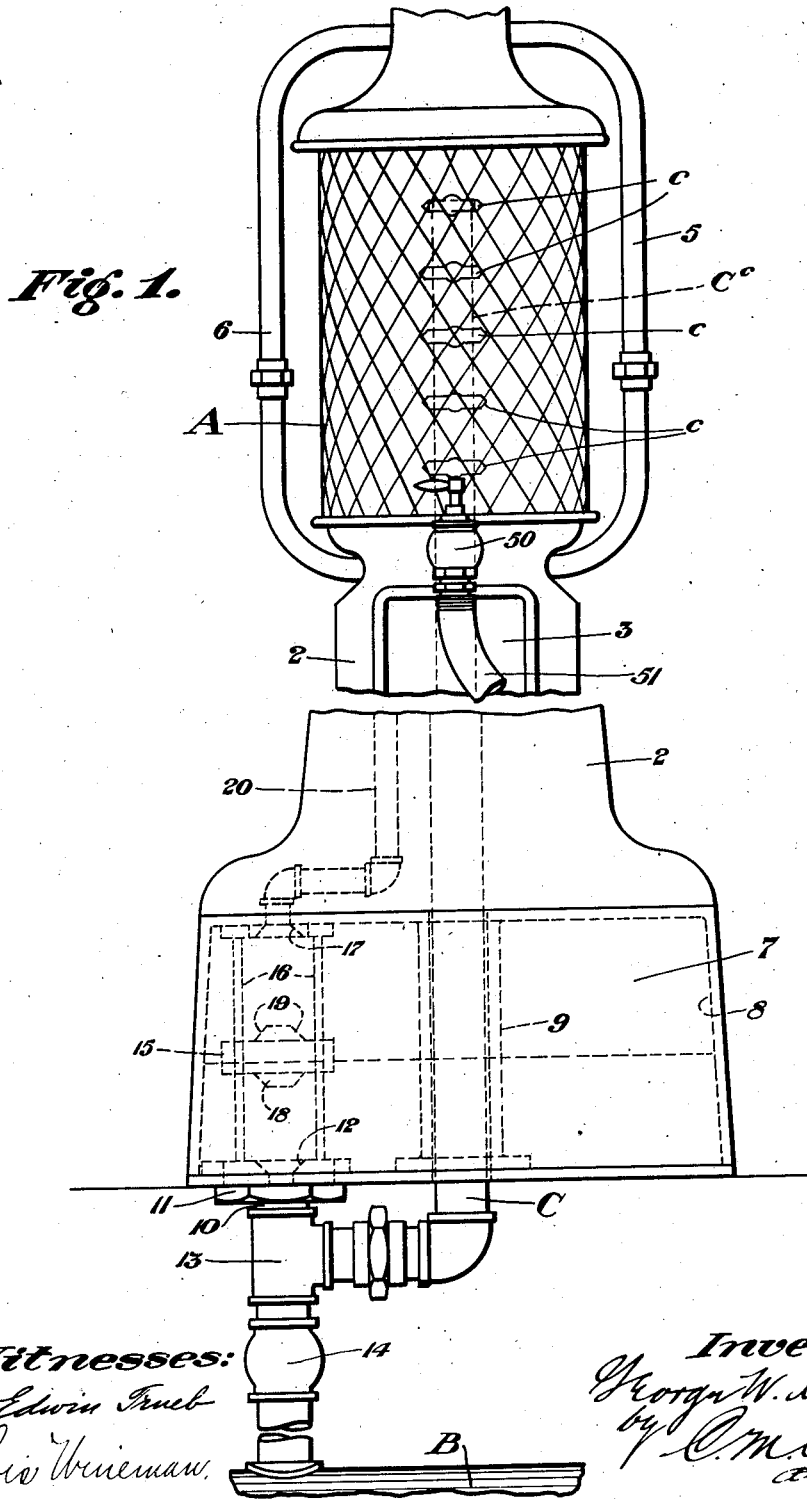
Fig. 1 is a view in front elevation, partly broken away, of a standard equipment provided with my improvement.
Figure 2:
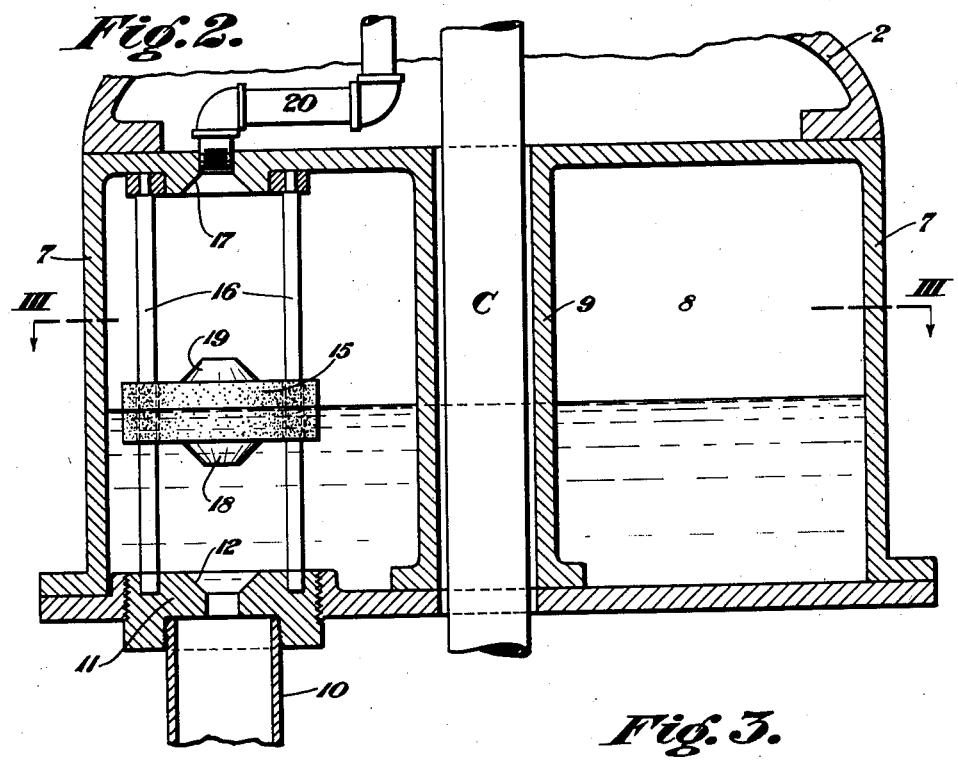
Fig. 2 is an enlarged vertical sectional view through the auxiliary tank or sub-base of the machine.
Figure 3:
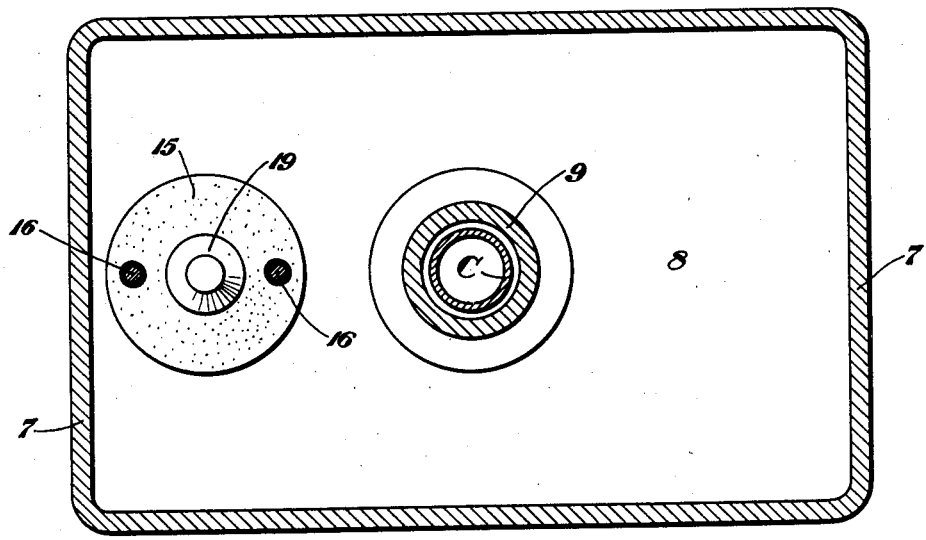
Fig. 3 is a cross section on the line III—III of Fig. 2.

The apparatus is provided at its upper portion with a measuring vessel A, preferably of glass, mounted upon a supporting casing or frame 2. Vessel A is adapted to receive fluid directly from a main reservoir B by means of an intervening conduit C, the upper portion of which is preferably adjustable, as in the patents noted. Conduit C may, however, terminate at any fixed level so as to measure an unvarying amount, as five gallons, if desired. The machine is preferably provided with an opening and closing door 3, for access to the interior of casing 2, and may also have at its top a lamp shade of suitable ornamental design. Current supply wires for a lamp are ordinarily carried in a conduit 5 at one side, and a similar conduit 6 connects the interior of vessel A with a pump or other suitable air exhausting device, not shown.

In the construction of Fig. 1, liquid is charged into vessel A, upon exhausting the air therefrom, by supply pipe C, and is withdrawn from the measuring vessel by outlet conduit 49, controlling valve 50, and service hose 51, by which the measured contents of the vessel are conducted to any receiving holder, as the tank of an automobile.

In filling vessel A, there is ordinarily a surplus of liquid, which flows back through conduit C, leaving the measured amount level with the top of the pipe. Heretofore, such surplus has been returned to the main tank B at each operation, and where the main tank is remote from the machine, this has involved considerable delay in refilling the measuring vessel. The same is true in case of force feed measuring vessels operating on the principle of an overflow pipe operating to determine the level of the measured liquid.

In my present invention, I provide a secondary or auxiliary tank between the measuring vessel and the main tank, and near to the former, adapted to receive and collect the overflow, which is to be first returned to the measuring tank at the next operation in connection with the main supply system. By this means, I am enabled to draw directly from the auxiliary tank without delay, first exhausting its contents, then the main supply is placed in course of movement, so that there is a prompt and continuous supply available at all times, The auxiliary tank 7 may be conveniently located between the bottom of casing 2 and its foundation, and forms a pedestal or base for the machine. It has a cavity 8 of a capacity which may be equal or greater than that of vessel A, but ordinarily not more than that of the normal overflow for each operation.

Pipe C extends down through the casing 2 and reservoir 7 but has no direct connection with it, and is preferably carried through a hollow separating tubular wall 9. Conduit C has a branch pipe 10 leading upwardly to the base of casing 7 and opening thereinto by a ported plug 11 having a valve seat 12 at its upper side. Below the connection 10 and fitting 13 is an upwardly opening check valve 14 in the main line leading back to the main reservoir. A float 15 is mounted above plug 11 on guide rods 16 and in line with a valve seated air port 17 in the upper wall of casing 7. Float 15 is provided with corresponding valves 18 and 19 and will seal one port or the other in lowered or raised position respectively.

A vent pipe 20 connects port 17 with any suitable outlet communication with the atmosphere, or, if preferred, with the main supply reservoir, but will be sealed by float 15 should contents of tank 7 ever be enough to raise the float so far.

The operation is as follows:

Assuming vessel A is to be filled to the desired level of any predetermined amount of liquid to be delivered by hose 51, air suction will first remove the contents of tank 7 upwardly through conduit C during the time that the column of liquid below check valve 14 is beginning to move upwardly subject to the same suction. Due to its gravity, all of the liquid in reservoir 7 will pass outwardly, through fitting 13 and upwardly to the measuring vessel, float 15 then seating and closing valve port 12. This is because the contents of subreservoir 7 will first flow on account of its smaller resistance, compared to the flow from the main reservoir. Then the main supply from tank B will immediately follow, until vessel A is filled as usual, the surplus overflow returning backwardly through conduit C, upon breaking the vacuum. Check valve 14, however, will prevent its return to reservoir B and the surplus will pass upwardly into auxiliary reservoir 7, carrying float 15 to whatever level may exist. Thereupon, the contents of vessel A having been delivered to a purchaser, the operation above described is repeated. Of course, it will be understood that if the amount of the overflow return is negligible at any time, the apparatus is capable of being used in the usual way by drawing directly from the main tank B.

In Fig. 4 I show the manner in which the invention may be utilized with an alternative forced feed of the liquid, as by use of any suitable form of pump D. In such case, the supply and overflow pipe $C^c$ may be either vertically adjustable for the different unit levels $c$, $c$, or fixed, and the surplus is returnable therethrough to fitting $13^a$ above the check valve $14^a$ in the manner already described. A float $15^a$ operates to seal the liquid and air ports $12^a$ and $17^a$ respectively in the manner already described. Below the check valve $14^a$ the separate pump conduit 21 is connected with the main supply conduit C by a fitting 22 and conduit 21 is provided above upwardly opening check valve $14^b$ with the pump D of any suitable construction. A delivery conduit 23 leads to and empties into the upper part of measuring vessel A.

As in Fig. 4, the supply conduit 21 is connected by fitting $13^b$ with a branch pipe $10^b$ opening through valve controlled port $12^b$ to the interior of tank $7^a$.

A float $15^b$ similar to float 15 and $15^a$ is mounted for vertical movement on guides $16^b$ and is provided with valves $18^b$ and $19^b$ for ports $12^b$ and $17^b$ respectively, a common vent line $20^b$ leading off from the latter and from port $17^a$ to the atmosphere or other suitable connection.

The operation of this form of the invention is substantially the same as the one first described, except that liquid is delivered by the pump D into the vessel A under normal atmospheric conditions, instead of by suction of the vacuum line 6, as in Fig. 1. Any overflow passes back through conduit $C^c$, fitting $13^a$ and connection $10^a$ to the interior of casing $7^a$, and will be first removed by action of pump D prior to the main flow from storage reservoir B. With either construction, I am enabled to collect the overflow from each measuring operation in the auxiliary storage vessel 7 or $7^a$ within short transfer distance of the measuring vessel A so that filling of it is commenced immediately and continued without loss of time. The invention greatly facilitates the use of gasoline or other liquid vending machines, and overcomes any objections due to the delay referred to.

The apparatus utilized may be changed or modified in various details to adapt it to different conditions or applications by the skilled mechanic, but all such changes are to be considered as within the scope of the following claims.

What I claim is:

1. A liquid measuring apparatus having a measuring vessel, a main supply tank, a supply conduit leading directly from the supply tank to the measuring vessel, means for inducing a flow of liquid therethrough, an overflow receptacle adapted to receive surplus liquid from the measuring vessel, a conduit leading from the overflow receptacle into the supply conduit, and an operating valve for opening and closing said conduit from the overflow tank to the supply conduit.

2. A liquid measuring apparatus having a measuring vessel, a main supply tank, a supply conduit leading directly from the supply tank to the measuring vessel, means for inducing a flow of liquid therethrough, an overflow receptacle adapted to receive surplus liquid from the measuring vessel, a check valve in the supply conduit, and a conduit leading from the overflow receptacle into the supply conduit above the check valve.

3. A liquid measuring apparatus having a measuring vessel, a main supply tank, a supply conduit leading directly from the supply tank to the measuring vessel, means for inducing a flow of liquid therethrough, an overflow receptacle adapted to receive surplus liquid from the measuring vessel, a check valve in the supply conduit, a conduit leading from the overflow receptacle into the supply conduit above the check valve, a connection therefrom to the overflow receptacle having a valve seated port, and a valve therefor.

4. A liquid measuring apparatus having a measuring vessel, a main supply tank, a supply conduit leading directly from the supply tank to the measuring vessel, means for inducing a flow of liquid therethrough, an overflow receptacle adapted to receive surplus liquid from the measuring vessel, a check valve in the supply conduit, an overflow conduit above the check valve, a connection therefrom to the overflow receptacle having a valve seated port and a buoyant valve therefor provided with means for guiding it vertically.

5. In combination, a main reservoir, a measuring vessel, an intervening overflow receptacle, a conduit leading from the main reservoir to the measuring vessel having a branch connection with the overflow receptacle and a check valve, and means for inducing a flow of liquid therethrough from the main reservoir.

6. In combination, a main reservoir, a measuring vessel, an intervening overflow receptacle, a conduit leading from the main reservoir to the measuring vessel having a branch connection with the overflow receptacle and a check valve, a valve seated port between the branch connection and the overflow receptacle, a buoyant valve therefor, and means for inducing a flow of liquid through the conduit from the main reservoir.

7. A liquid measuring apparatus comprising a measuring vessel, a main supply tank, an overflow vessel interposed between the main supply tank and measuring apparatus for receiving the overflow from the latter, a conduit for transferring liquid from the supply tank to the measuring vessel, and means for returning the overflow contents of said overflow vessel directly to said conduit to utilize said contents when filling the measuring vessel.

In testimony whereof I hereunto affix my signature.

GEORGE W. MacKENZIE.